United States Patent
Keller

(12) United States Patent (10) Patent No.: US 6,516,263 B1
Keller (45) Date of Patent: Feb. 4, 2003

(54) ADAPTIVE FLAME-OUT PREVENTION

(75) Inventor: Timothy J. Keller, Albuquerque, NM (US)

(73) Assignee: Honeywell Power Systems Inc., Morristown, NJ (US)

( * ) Notice: Subject to any disclaimer, the term of this patent is extended or adjusted under 35 U.S.C. 154(b) by 6 days.

(21) Appl. No.: 09/922,433

(22) Filed: Aug. 2, 2001

(51) Int. Cl.$^7$ ................................................. F02C 9/28
(52) U.S. Cl. ................................. 701/100; 60/39.281
(58) Field of Search ............................. 701/100, 103, 701/104; 60/39.281, 243

(56) References Cited

U.S. PATENT DOCUMENTS

| | | | |
|---|---|---|---|
| 3,805,517 A | * | 4/1974 | Sewell et al. ................. 60/223 |
| 3,832,846 A | | 9/1974 | Leeson |
| 3,846,061 A | * | 11/1974 | Wright et al. ............ 250/214.1 |
| 3,866,108 A | | 2/1975 | Yannone et al. |
| 4,016,717 A | | 4/1977 | Smith et al. |
| 4,039,804 A | | 8/1977 | Reed et al. |
| 4,319,320 A | | 3/1982 | Sato et al. |
| 4,454,754 A | * | 6/1984 | Zagranski et al. ......... 340/439 |
| 4,470,257 A | | 9/1984 | Wescott |
| 4,783,957 A | | 11/1988 | Harris |
| 5,083,277 A | | 1/1992 | Shutler |
| 5,095,221 A | | 3/1992 | Tyler |
| 5,103,629 A | | 4/1992 | Mumford et al. |
| 5,252,860 A | | 10/1993 | McCarty et al. |
| 5,272,637 A | | 12/1993 | Urushidani et al. |
| 5,274,996 A | | 1/1994 | Goff et al. |
| 5,551,227 A | * | 9/1996 | Moulton et al. ......... 60/39.091 |
| 5,596,871 A | | 1/1997 | Lenertz |
| 5,819,196 A | | 10/1998 | Holmes et al. |
| 5,855,112 A | | 1/1999 | Bannai et al. |
| 6,062,016 A | | 5/2000 | Edelman |

FOREIGN PATENT DOCUMENTS

JP WO97/09524 3/1997

* cited by examiner

*Primary Examiner*—Michael J. Zanelli
(74) *Attorney, Agent, or Firm*—Robert Desmond, Esq.

(57) ABSTRACT

An automated system and method for preventing flame-outs in turbine power generating systems comprising: establishing a minimum fuel schedule for a turbine; detecting occurrence of a flame-out of the turbine; and automatically increasing the minimum fuel schedule for the turbine.

32 Claims, 2 Drawing Sheets

ADAPTIVE FLAME-OUT PREVENTION

BACKGROUND OF THE INVENTION

1. Field of the Invention (Technical Field)

The present invention relates to control techniques and systems for preventing flame-outs in generating systems.

2. Background Art

For flame-out prevention in microturbines, one has to determine a flame-out fuel flow limit (lean blow-out schedule) and then use sensor feedback during microturbine operation to make sure that one does not go below the flame-out limit. Illustrative of prior methods which accomplish this (or treat similar problems) include U.S. Pat. No. 5,819,196 (Method and system for adaptive fuel delivery feedforward control); U.S. Pat. No. 5,272,637 (Method and apparatus for controlling the supply of fuel to a gas turbine during load rejection); U.S. Pat. No. 5,083,277 (Fuel Control System); U.S. Pat. No. 4,783,957 (Fuel Control circuit for a turbine engine); and U.S. Pat. No. 3,832,846 (Speed governor with fuel rate control).

Microturbines are high speed, single or dual shaft, low compression turbine-driven generators of electricity and/or other power, and producing up to about 500 kW. They are multi-fuel, modular distributed power generation units having multiple applications. They offer the capability to produce electricity at a lower cost per kilowatt than do central plants, and they do not require the installation of expensive infrastructure to deliver power to the end users. Thus, in parts of the world lacking the transmission and distribution lines of a basic electric infrastructure, commercialization of microturbines may be greatly expedited. In the United States and other countries already having a suitable electric infrastructure, distributed generation units will allow consumers of electricity to choose the most cost-effective method of electric service. In addition to primary power generation, microturbines also offer an efficient way to supply back-up power, uninterruptible power, peak-shaving, and combined heat (or chilling) and power through the use of cogeneration equipment. Other applications for microturbines exist as well.

The present invention operates to make a subsequent flame-out less likely after a flame-out has occurred. It increases the lean blow-out schedule for the next time that the microturbine runs. This process repeats until either there are no more flame-outs, or one hits a fuel flow limit (e.g., a maximum offset of 1.5 lb/hr). The present invention permits use of both inexpensive fuel controls and inexpensive fuel flow sensors. In a small percentage of engines, flame-outs will occur. The present invention automates resolving the problem in the long run, rather than using substantially more expensive and accurate sensors.

SUMMARY OF THE INVENTION (DISCLOSURE OF THE INVENTION)

The present invention is of an automated system and method for preventing flame-outs in turbine power generating systems comprising: establishing a minimum fuel schedule for a turbine; detecting occurrence of a flame-out of the turbine; and automatically increasing the minimum fuel schedule for the turbine. In the preferred embodiment, the turbine is a microturbine. Detecting is of a speed droop shutdown of the turbine. Detecting is repeated after increasing and the increasing step is repeated such that the minimum fuel schedule does not exceed a maximum offset from the minimum fuel schedule established in the establishing step. The minimum fuel schedule is increased by a predetermined increment. Execution of the invention is preferably by an electronic control unit of a fuel flow control system for the turbine, and using fuel flow sensors having a tolerance of between approximately +/−4% and +/−10%.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings.

DETAILED DESCRIPTION

Figure 1:
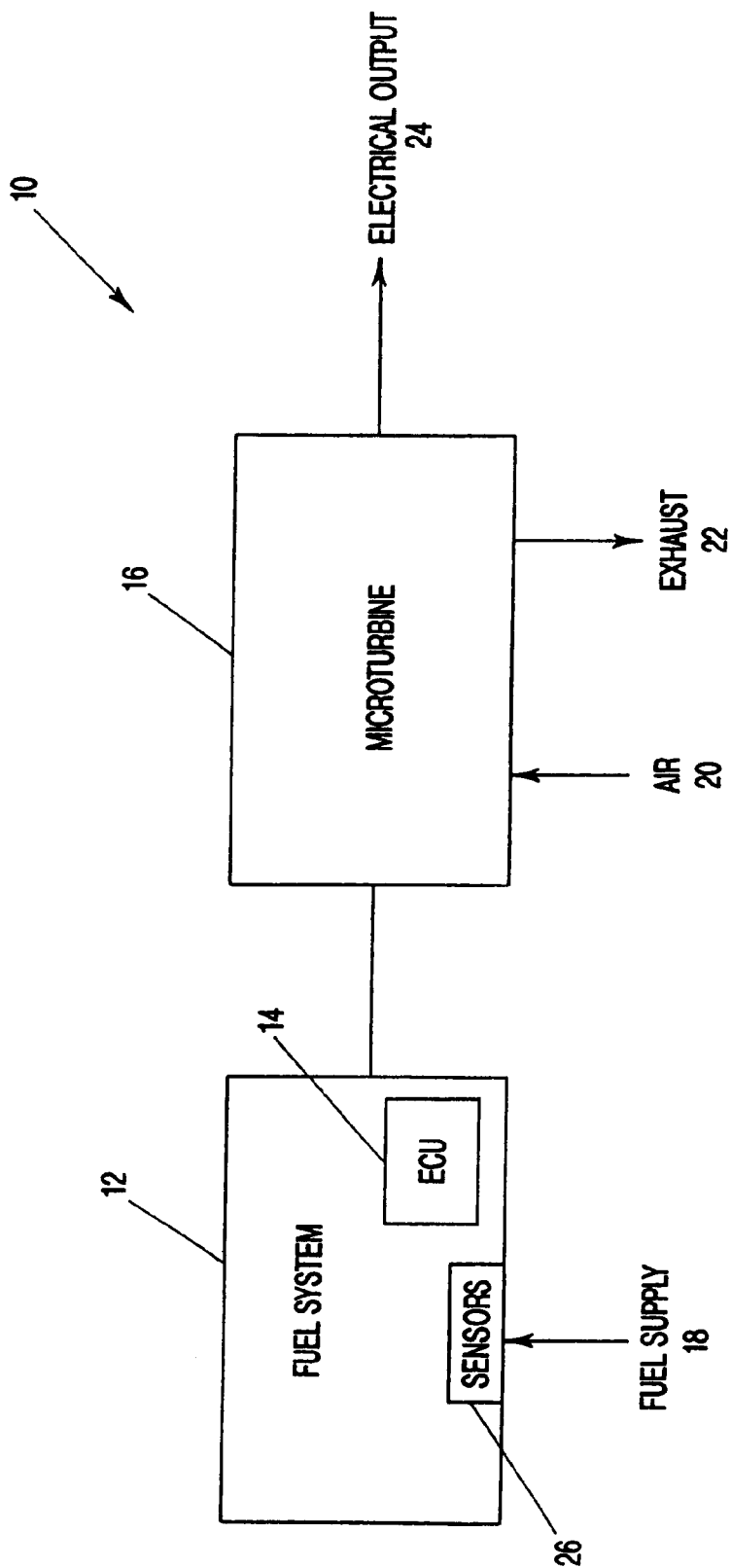
FIG. 1 is a block diagram of the preferred system of the invention.

Referring to FIG. 1, the present invention is of an adaptive method and system for flame-out prevention in a microturbine power system 10. The fuel flow control system 12 for the microturbine 16 (which also receives as input air 20 and outputs exhaust 22 and electricity 24) includes an electronic control unit (ECU) 14. The variation in fuel flow sensors 26 measuring input from fuel supply 18 makes it difficult to establish a proper lean blow-out schedule in the ECU. If sensors erroneously indicate a higher than normal fuel flow (for example, the sensors indicate a fuel flow of 18 lb/hr when the actual fuel flow is 16.5 lb/hr), then the turbine will have a tendency to flame-out, thereby undesirably terminating operation.

Figure 2:
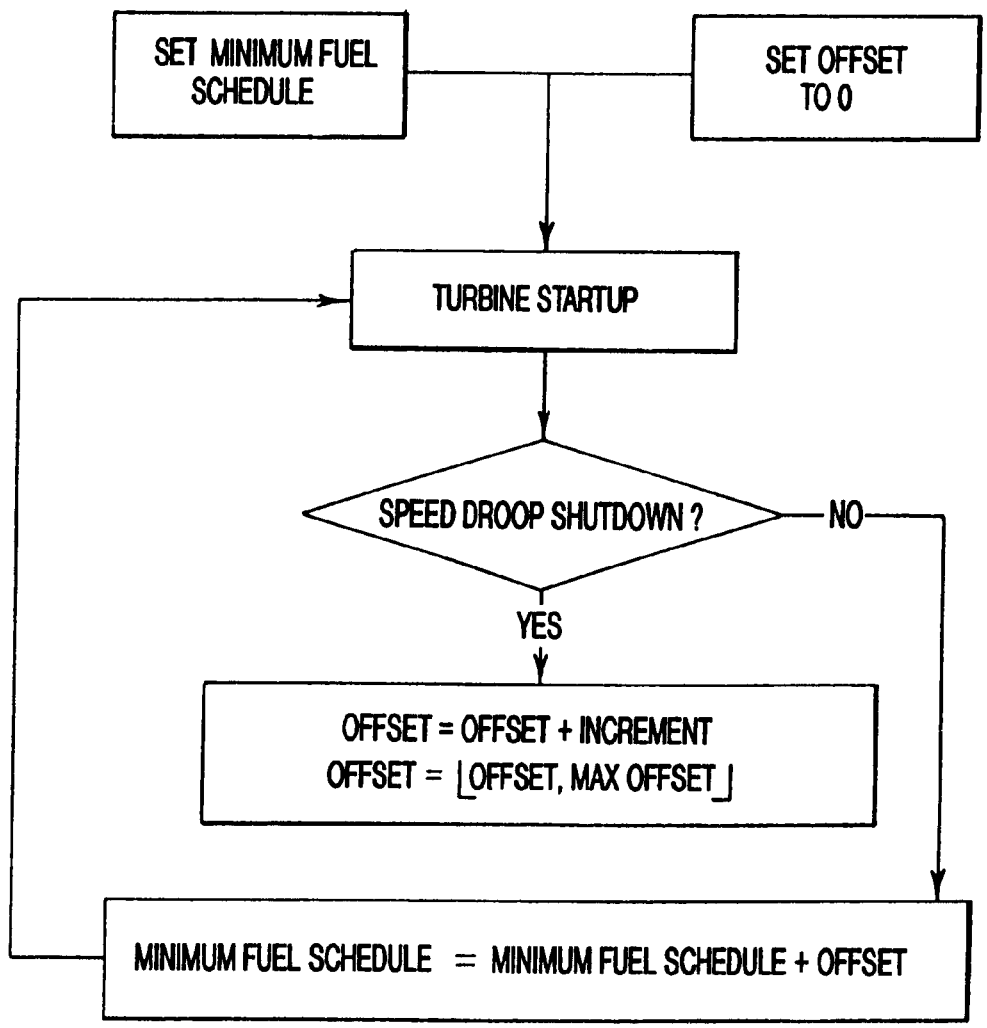
FIG. 2 is a logic diagram of the preferred method of the invention.

Referring to FIG. 2, a turbine's lean blow-out schedule (MinimumFuelSchedule) is set initially at a startup value, and a value added to MinimumFuelSchedule on each startup is set to zero (Offset). The invention automatically raises Offset in increments (Increment) (such as by 0.25 lb/hr) in the ECU following a flame-out (speed droop shutdown) and uses such higher schedule on all subsequent runs. In other words, the invention works to compensate for inaccuracies in low-cost fuel flow sensors (e.g., those with an error tolerance of between approximately +/−4% and +/−10%), in effect calibrating the fuel sensors without making any changes to them. This does not prevent a system from initially flaming out, but does prevent future flame-outs. If a flame-out subsequent to the first occurs, the invention increases the lean blow-out schedule in a similar increment (e.g., by 0.25 lb/hr) until a maximum offset (MaxOffset) (such as of 1.5 lb/hr) is reached. Offset is preferably stored in EEPROM or other non-volatile memory so that even if the ECU is powered down the Offset will be applied during the next startup.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. An automated method for preventing flame-outs in turbine power generating systems, the method comprising the steps of:

establishing a minimum fuel schedule for a turbine;

detecting occurrence of a flame-out of the turbine; and automatically increasing the minimum fuel schedule for the turbine.

2. The method of claim 1 wherein in the establishing, detecting, and increasing steps the turbine is a microturbine.

3. The method of claim 1 wherein the detecting step comprises detecting a speed droop shutdown of the turbine.

4. The method of claim 1 additionally comprising the step of repeating the detecting step after the increasing step and repeating the increasing step such that the minimum fuel schedule does not exceed a maximum offset from the minimum fuel schedule established in the establishing step.

5. The method of claim 1 wherein in the increasing step the minimum fuel schedule is increased by a predetermined increment.

6. The method of claim 1 wherein the establishing, detecting, and increasing steps are executed by an electronic control unit of a fuel flow control system for the turbine.

7. The method of claim 1 additionally comprising the step of employing fuel flow sensors having an error tolerance of between approximately +/−4% and +/−10%.

8. An automated method for preventing flame-outs in turbine power generating systems, the method comprising the steps of:

establishing a minimum fuel schedule for a turbine;

detecting occurrence of a flame-out of the turbine;

automatically increasing the minimum fuel schedule for the turbine; and repeating the detecting step after the increasing step and repeating the increasing step such that the minimum fuel schedule does not exceed a maximum offset from the minimum fuel schedule established in the establishing step.

9. The method of claim 8 wherein in the establishing, detecting, and increasing steps the turbine is a microturbine.

10. The method of claim 8 wherein the detecting step comprises detecting a speed droop shutdown of the turbine.

11. The method of claim 8 wherein the establishing, detecting, and increasing steps are executed by an electronic control unit of a fuel flow control system for the turbine.

12. The method of claim 8 additionally comprising the step of employing fuel flow sensors having an error tolerance of between approximately +/−4% and +/−10%.

13. An automated system for preventing flame-outs in turbine power generating systems, said system comprising:

means for establishing a minimum fuel schedule for a turbine;

means for detecting occurrence of a flame-out of the turbine; and means for automatically increasing the minimum fuel schedule for the turbine.

14. The system of claim 13 wherein the turbine is a microturbine.

15. The system of claim 13 wherein said detecting means comprises means for detecting a speed droop shutdown of the turbine.

16. The system of claim 13 additionally comprising means for invoking said detecting means after invocation of said increasing means and again invoking said increasing means such that the minimum fuel schedule does not exceed a maximum offset from the minimum fuel schedule established by the establishing means.

17. The system of claim 13 wherein said increasing means comprises means for increasing the minimum fuel schedule by a predetermined increment.

18. The system of claim 13 wherein said establishing, detecting, and increasing means are executed by an electronic control unit of a fuel flow control system for the turbine.

19. The system of claim 13 additionally comprising fuel flow sensors having an error tolerance of between approximately +/−4% and +/−10%.

20. An automated system for preventing flame-outs in turbine power generating systems, said system comprising:

means for establishing a minimum fuel schedule for a turbine;

means for detecting occurrence of a flame-out of the turbine;

means for automatically increasing the minimum fuel schedule for the turbine; and means for invoking said detecting means after invocation of said increasing means and again invoking said increasing means such that the minimum fuel schedule does not exceed a maximum offset from the minimum fuel schedule established by the establishing means.

21. The system of claim 20 wherein the turbine is a microturbine.

22. The system of claim 20 wherein said detecting means comprises means for detecting a speed drop shutdown of the turbine.

23. The system of claim 20 wherein said establishing, detecting, and increasing means are executed by an electronic control unit of a fuel flow control system for the turbine.

24. The system of claim 20 additionally comprising fuel flow sensors having an error tolerance of between approximately +/−4% and +/−10%.

25. An automated method for preventing flame-outs in microturbine power generating systems, the method comprising the steps of:

establishing a minimum fuel schedule for a microturbine;

detecting occurrence of a flame-out of the microturbine; and automatically increasing the minimum fuel schedule for the microturbine.

26. An automated method for preventing flame-outs in microturbine power generating systems, the method comprising the steps of:

establishing a minimum fuel schedule for a microturbine;

detecting occurrence of a flame-out of the microturbine;

automatically increasing the minimum fuel schedule for the microturbine; and repeating the detecting step after the increasing step and repeating the increasing step such that the minimum fuel schedule does not exceed a maximum offset from the minimum fuel schedule established in the establishing step.

27. An automated system for preventing flame-outs in microturbine power generating systems, said system comprising:

means for establishing a minimum fuel schedule for a microturbine;

means for detecting occurrence of a flame-out of the microturbine; and means for automatically increasing the minimum fuel schedule for the microturbine.

28. An automated system for preventing flame-outs in microturbine power generating systems, said system comprising:

means for establishing a minimum fuel schedule for a microturbine;

means for detecting occurrence of a flame-out of the microturbine;

means for automatically increasing the minimum fuel schedule for the microturbine; and means for invoking said detecting means after invocation of said increasing means and again invoking said increasing means such that the minimum fuel schedule does not exceed a maximum offset from the minimum fuel schedule established by the establishing means.

29. An automated method for preventing flame-outs in turbine power generating systems, the method comprising the steps of:

establishing a minimum fuel schedule for a turbine;

employing fuel flow sensors having an error tolerance of between approximately +/−4% and +/−10%;

detecting occurrence of a flame-out of the turbine; and automatically increasing the minimum fuel schedule for the turbine.

30. An automated method for preventing flame-outs in turbine power generating systems, the method comprising the steps of:

establishing a minimum fuel schedule for a turbine;

employing fuel flow sensors having an error tolerance of between approximately +/−4% and +/−10%;

detecting occurrence of a flame-out of the turbine;

automatically increasing the minimum fuel schedule for the turbine; and repeating the detecting step after the increasing step and repeating the increasing step such that the minimum fuel schedule does not exceed a maximum offset from the minimum fuel schedule established in the establishing step.

31. An automated system for preventing flame-outs in turbine power generating systems, said system comprising:

means for establishing a minimum fuel schedule for a turbine;

fuel flow sensors having an error tolerance of between approximately +/−4% and +/−10%;

means for detecting occurrence of a flame-out of the turbine; and means for automatically increasing the minimum fuel schedule for the turbine.

32. An automated system for preventing flame-outs in turbine power generating systems, said system comprising:

means for establishing a minimum fuel schedule for a turbine;

fuel flow sensors having an error tolerance of between approximately +/−4% and +/−10%;

means for detecting occurrence of a flame-out of the turbine;

means for automatically increasing the minimum fuel schedule for the turbine; and means for invoking said detecting means after invocation of said increasing means and again invoking said increasing means such that the minimum fuel schedule does not exceed a maximum offset from the minimum fuel schedule established by the establishing means.

\* \* \* \* \*